US009747737B2

(12) United States Patent
Kuenzi

(10) Patent No.: US 9,747,737 B2
(45) Date of Patent: Aug. 29, 2017

(54) SYSTEMS AND METHODS FOR LOCKING DEVICE MANAGEMENT INCLUDING TIME DELAY POLICIES USING RANDOM TIME DELAYS

(71) Applicant: UTC FIRE & SECURITY AMERICAS CORPORATIONS, INC., Bradenton, FL (US)

(72) Inventor: Adam Kuenzi, Salem, OR (US)

(73) Assignee: UTC FIRE & SECURITY AMERICAS CORPORATION, INC., Bradenton, FL (US)

( * ) Notice: Subject to any disclaimer, the term of this patent is extended or adjusted under 35 U.S.C. 154(b) by 0 days.

(21) Appl. No.: 15/031,502

(22) PCT Filed: Aug. 28, 2014

(86) PCT No.: PCT/US2014/053114
§ 371 (c)(1),
(2) Date: Apr. 22, 2016

(87) PCT Pub. No.: WO2015/060940
PCT Pub. Date: Apr. 30, 2015

(65) Prior Publication Data

US 2016/0260274 A1 Sep. 8, 2016

Related U.S. Application Data

(60) Provisional application No. 61/895,003, filed on Oct. 24, 2013.

(51) Int. Cl.
*G05B 19/00* (2006.01)
*G07C 9/00* (2006.01)
(Continued)

(52) U.S. Cl.
CPC .......... *G07C 9/00309* (2013.01); *E05B 41/00* (2013.01); *E05B 43/005* (2013.01);
(Continued)

(58) Field of Classification Search
CPC ...... G07C 9/00817; G07C 2009/00246; G07C 2009/00428
(Continued)

(56) References Cited

U.S. PATENT DOCUMENTS 5,349,345 A 9/1994 Vanderschel
5,774,058 A * 6/1998 Henry ................ G07C 9/00015 109/32
(Continued)

FOREIGN PATENT DOCUMENTS

EP 0599635 A1 6/1994
GB 2219676 A 12/1989

OTHER PUBLICATIONS

International Search Report and Written Opinion for International Application No. PCT/US2014/053114, Dated Mar. 12, 2014.

*Primary Examiner* — Carlos E Garcia
(74) *Attorney, Agent, or Firm* — Locke Lord LLP; Scott D. Wofsy; Joshua L. Jones

(57) ABSTRACT

A locking device employs improved lock management techniques based on time delay polices that use a random period of time. The locking device receives a first credential of a custodian, validates the first credential and determines a random period of time based upon a time-delay policy when the first credential is validated. The locking device executes a lock release protocol upon expiration of the random period of time.

16 Claims, 4 Drawing Sheets

(51) Int. Cl.

| | |
|---|---|
| ***E05B 41/00*** | (2006.01) |
| ***E05B 43/00*** | (2006.01) |
| ***E05B 45/00*** | (2006.01) |
| ***E05B 51/00*** | (2006.01) |
| ***E05B 65/00*** | (2006.01) |
| *E05B 47/00* | (2006.01) |

(52) U.S. Cl.
CPC .............. *E05B 45/00* (2013.01); *E05B 51/00* (2013.01); *E05B 65/0032* (2013.01); *G07C 9/00817* (2013.01); *E05B 2047/0067* (2013.01); *E05B 2047/0071* (2013.01); *E05B 2047/0072* (2013.01); *G07C 9/00896* (2013.01); *G07C 2009/00436* (2013.01); *G07C 2209/08* (2013.01)

(58) Field of Classification Search
USPC ...... 340/5.2, 5.21, 5.28, 5.3, 5.31, 5.6, 5.63, 340/430
See application file for complete search history.

(56) References Cited

U.S. PATENT DOCUMENTS

| | | | | |
|---|---|---|---|---|
| 5,787,819 | A | 8/1998 | Fumanelli | |
| 5,979,198 | A | 11/1999 | Haas-Trober et al. | |
| 6,741,160 | B1 * | 5/2004 | Dawson | G07C 9/00666 340/5.2 |
| 2003/0230124 | A1 | 12/2003 | Johnson et al. | |
| 2009/0015372 | A1 * | 1/2009 | Kady | G06F 1/26 340/5.54 |
| 2009/0058624 | A1 * | 3/2009 | Kane | B60L 3/02 340/439 |
| 2012/0157080 | A1 * | 6/2012 | Metivier | G07C 9/00309 455/420 |
| 2013/0262865 | A1 * | 10/2013 | Irvine | G06F 21/6218 713/165 |

* cited by examiner

SYSTEMS AND METHODS FOR LOCKING DEVICE MANAGEMENT INCLUDING TIME DELAY POLICIES USING RANDOM TIME DELAYS

RELATED APPLICATIONS

This application claims the benefit of and priority to U.S. Provisional Patent Application No. 61/895,003 filed Oct. 24, 2013, the contents of which are incorporated herein by reference in their entirety.

BACKGROUND

1. Field of the Invention

The present disclosure relates to locking devices, and more particularly, to systems and methods for lock device management using time delay policies.

2. Description of the Related Art

Conventional electronic locks are deployed to control access to commercial and residential buildings and particular spaces (e.g., rooms, closets, vaults, etc.) located therein. Typically, electronic locks ("locking devices") are reprogrammable to allow access to different keys without being physically re-keyed.

Some locking devices also include anti-theft time delay mechanisms that unlock after a fixed length of time after security credentials are validated. Such time delay mechanisms provide additional time for emergency personnel to arrive at the location of the locking device when, for example, a theft is in progress. However, if the fixed length of time needs to be changed, the locking device requires reprogramming, which proves logistically challenging.

Additionally, under routine circumstances, the fixed length of time for the anti-theft time delay can become predictable and may be inadvertently compromised by custodians. For example, custodians access the locking device to exchange monies. In some instances, custodians initiate the unlock process and leave the locking device unattended until the fixed length of time expires (instead of waiting beside the locking device). If the custodian leaves the device unattended after the locking device unlocks or opens, the anti-theft time delay mechanisms can become effectively compromised.

Such conventional locking devices have generally been considered satisfactory for their intended purpose. However, there is still a need in the art for more robust anti-theft mechanisms for locking devices using improved time delay policies. The present invention provides a solution for these problems.

SUMMARY

According to one or more embodiments of the subject disclosure, there is provided a locking device employing improved lock management techniques based on time delay polices that use a random period of time.

In one embodiment, the locking device receives a first credential of a custodian, validates the first credential and determines a random period of time based upon a time-delay policy when the first credential is validated. With respect to the time-delay policy, various factors can impact the random period of time including, but not limited to a threat level, custodian characteristics, geographic location of the locking device, and a time of day. Also, the time-delay policy can define one or more windows of time for the predetermined random period of time (e.g., 0-5 minutes, 5-10 minutes, 10-15 minutes, etc.). In certain circumstances, the time delay can include no-delay (e.g., a very low threat level, a custodian characteristic including a super-user, manager, owner, etc.). Once the random period of time expires, the locking device executes a lock release protocol. For example, the lock release protocol can include requesting, via the locking device, a second credential of the custodian within a specified time period (upon expiration of the random period of time) and receiving the second credential of the custodian within the specified time period. Once received, the locking device validates the second credential (within the specified time period) and executes a lock release command to unlock. However, the locking device restricts access when, for example, the first credential is invalid and/or the second credential is not received within the specified time period.

Notably, the random period of time of the time-delay policy can be determined by data from the locking device, a remote locking device management server, a custodian device (e.g., a mobile phone), and any combination thereof. For example, the locking device, the server, the custodian device can each provide location data (e.g., via GPS electronics, pre-programmed data, etc.), time-of-day data (e.g., via time-keeping electronics, etc.), and the like.

In certain embodiments, the custodian is required to initially input two credentials. The additional credential (e.g., additional to the first credential) is referred to hereinafter as a "third" credential. When used together the first and third credential can provide for two-factor authentication. In such embodiments, the locking device receives the third credential within a fixed length of time from receiving the first credential, and follows the above-discussed steps (e.g., validating the third credential, etc.), with respect to the third credential. Notably, any of the first, second or third credentials can be the same credential, different credentials, or any combination thereof. For example, the first credential can be a uniquely identifiable electronic device (e.g., a physical device or key carried by an individual—something you have"), while the third credential can include a manually entered pin code or password (e.g., something known to the individual).

In certain other embodiments, the time-delay policy is field programmable at the locking device. Further, the credentials (e.g., the first, second, or third credentials) are provided by an electronic key device (e.g., a mobile phone) and include, but are not limited to: an electronic identification, a digital certificate, a pass-code, a pin-code, an encrypted message, a manually entered code, or other information conveyed via a wireless or wired protocol from the key device to the locking device. In such embodiments, the random period of time can be determined by the electronic key device.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

A component or a feature that is common to more than one drawing is indicated with the same reference number in each of the drawings.

DESCRIPTION OF EXAMPLE EMBODIMENTS

Figure 1:
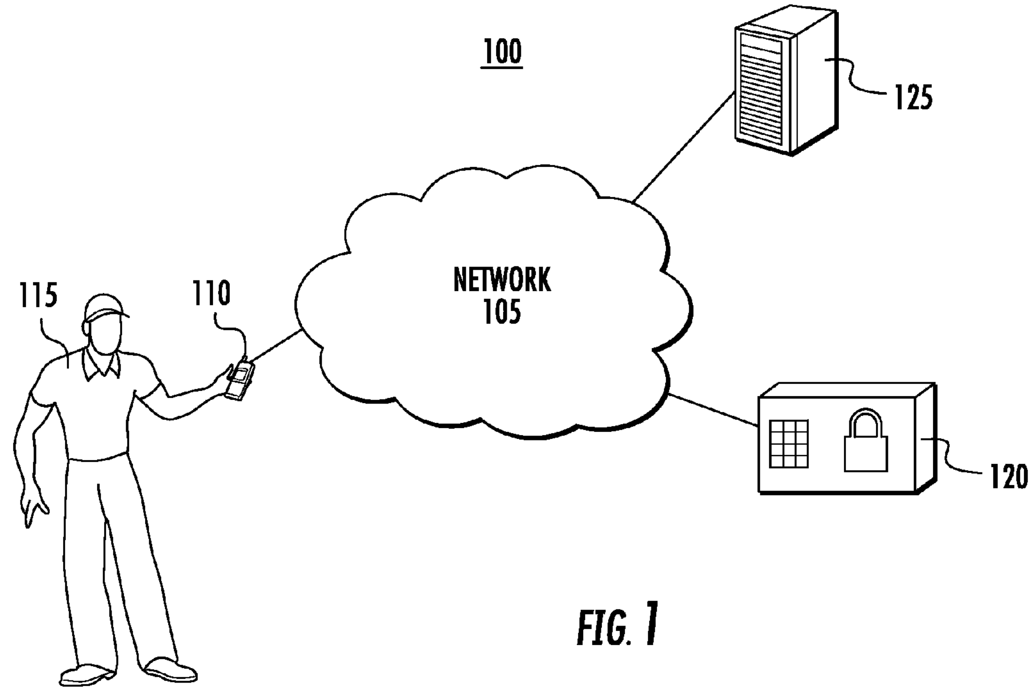
FIG. 1 illustrates a locking management system according to one embodiment of this disclosure.

Reference will now be made to the drawings wherein like reference numerals identify similar structural features or aspects of the subject invention. For purposes of explanation and illustration, and not limitation, a partial view of an exemplary embodiment of the locking management system in accordance with the invention is shown in FIG. 1 and is designated generally by reference character 100. Other embodiments of the locking device management system in accordance with the invention, or aspects thereof, are provided in FIGS. 2-4, as will be described. As appreciated by this disclosure, the invention can be used for improved lock security via, in part, a random generated time delay.

Referring to FIG. 1, a locking management system 100 is illustrated. Locking management system 100 includes various devices interconnected via a communication network 105. As shown, these various devices include a mobile device 110 (of a custodian 115), a locking device 120, and a locking management device 125.

Network 105 is a communication network that transports data between the various devices. Network 105 can be configured as a local area network (LAN), a wide area network (WAN), and the like. LANs typically connect devices over dedicated private communications links located in the same general physical location. WANs, on the other hand, typically connect geographically dispersed devices over long-distance communications links. Both LANs and WANs can be employed in "online" configurations (as shown).

Mobile device 110 is carried by a custodian 115 and is used to convey data or messages such as security credentials (e.g., access codes, etc.) to/from locking device management device 125 and/or locking device 120 via one or more wireless transceivers, near field communication (NFC) electronics, radio frequency identification (RFID) electronics, and the like. Further, it is appreciated that mobile device 110 can send/receive data according to various known protocols as discussed above, and further including Short Message Service (SMS), Multimedia Messaging Service (MMS), and the like. As shown, mobile device 110 is illustrated as a mobile phone executing software, however, it is appreciated that mobile device 110 also includes fixed propriety devices as well.

Locking management device 125 is shown as a server/computing device that manages/controls locking device 120. As shown, locking management device 125 communicates with mobile device 110 as well as locking device 120 via network 105. Operatively, locking management device 125 validates credentials from custodian 115 (e.g., credentials or access codes from mobile device 110, manual input by custodian 115, and/or other types of security credentials (e.g., key cards, etc.)). Once validated, locking management device 125 signals locking device 120 to release or unlock. Notably, although locking management device 125 is illustrated an independent and remote device separate and apart from locking device 120, it is appreciated that various configurations of locking management device 125 can be incorporated with or resident within locking device 120.

Locking device 120 represents any type of access restricting device. For example, locking device 120 includes mechanical and electrical components that operatively allow or deny access according to received signals from mobile device 110 and/or locking management device 125. Locking device 120, like locking management device 125, can be configured as a plurality of interconnected components capable of performing the functions discussed herein.

It is appreciated that locking management system 100, as depicted in FIG. 1, is merely exemplary and various other combinations and/or configurations with various other components can be included or excluded as desired.

Figure 2:
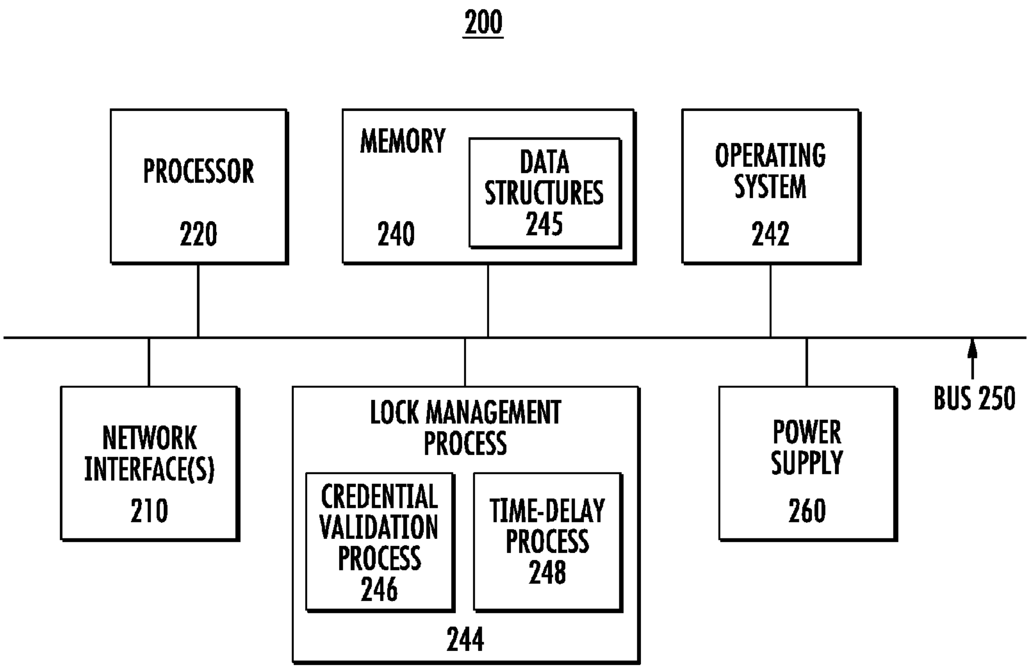
FIG. 2 illustrates an example device used in the locking management system of FIG. 1.

Referring to FIG. 2, depicted is a schematic block diagram of an example device 200 that may be used with one or more embodiments described herein, e.g., as any of mobile device 110, locking device 120, lock management device 125, or any combination thereof. As shown, device 200 comprises one or more network interfaces 210, at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data such as identification credentials, locking signals, etc. over physical and/or wireless links coupled to the network 105. The network interfaces may be configured to transmit and/or receive data using a variety of different communication protocols, including, inter alia, TCP/IP, UDP, wireless protocols (e.g., IEEE Std. 802.15.4, WiFi, Bluetooth®,), Ethernet, powerline communication (PLC) protocols, etc. Namely, one or more interfaces may be used to communicate with via hardwired signal paths between locking management device 125 and locking device 120, while another interface may be used as a LAN/WAN uplink network interface to mobile device 110 or other wireless identification devices.

The memory 240 comprises a plurality of storage locations that are addressable by the processor 220 and the network interfaces 210 for storing software programs and data structures associated with the embodiments described herein. Certain devices may have limited memory or no memory (e.g., no memory for storage other than for programs/processes operating on the device). The processor 220 may comprise necessary elements or logic adapted to execute the software programs and manipulate data structures 245, such as stored identification credentials. An operating system 242, portions of which are typically resident in memory 240 and executed by the processor, functionally organizes the device by, inter alia, invoking operations in support of software processes and/or services executing on the device. These software processes and/or services comprise a lock management process 244 that includes sub-processes such as credential validation process 246 and time delay process 248. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Illustratively, the techniques described herein may be performed by hardware, software, and/or firmware, such as in accordance with the processes 244 and sub-processes 246 and 248, which contain computer executable instructions executed by the processor 220 (or independent processor of network interfaces 210) to perform functions relating to the techniques described herein.

As noted above, some locking devices include anti-theft time delay mechanisms that unlock after a fixed length of time when initial security credentials are validated. However, such fixed length of time becomes predictable and may be inadvertently compromised by custodians that do not wish to wait beside the locking device for the fixed length of time. Further, changing or altering the fixed length of time requires reprogramming of the locking device and proves logistically challenging.

Accordingly, as described herein, the invention provides locking management systems and processes which use improved time delay policies. In particular, the locking devices and locking device management techniques validate one or more credentials of a custodian, determine a random period of time based upon the time delay policy and subsequently execute a lock release protocol when the random period of time expires.

Figure 3:
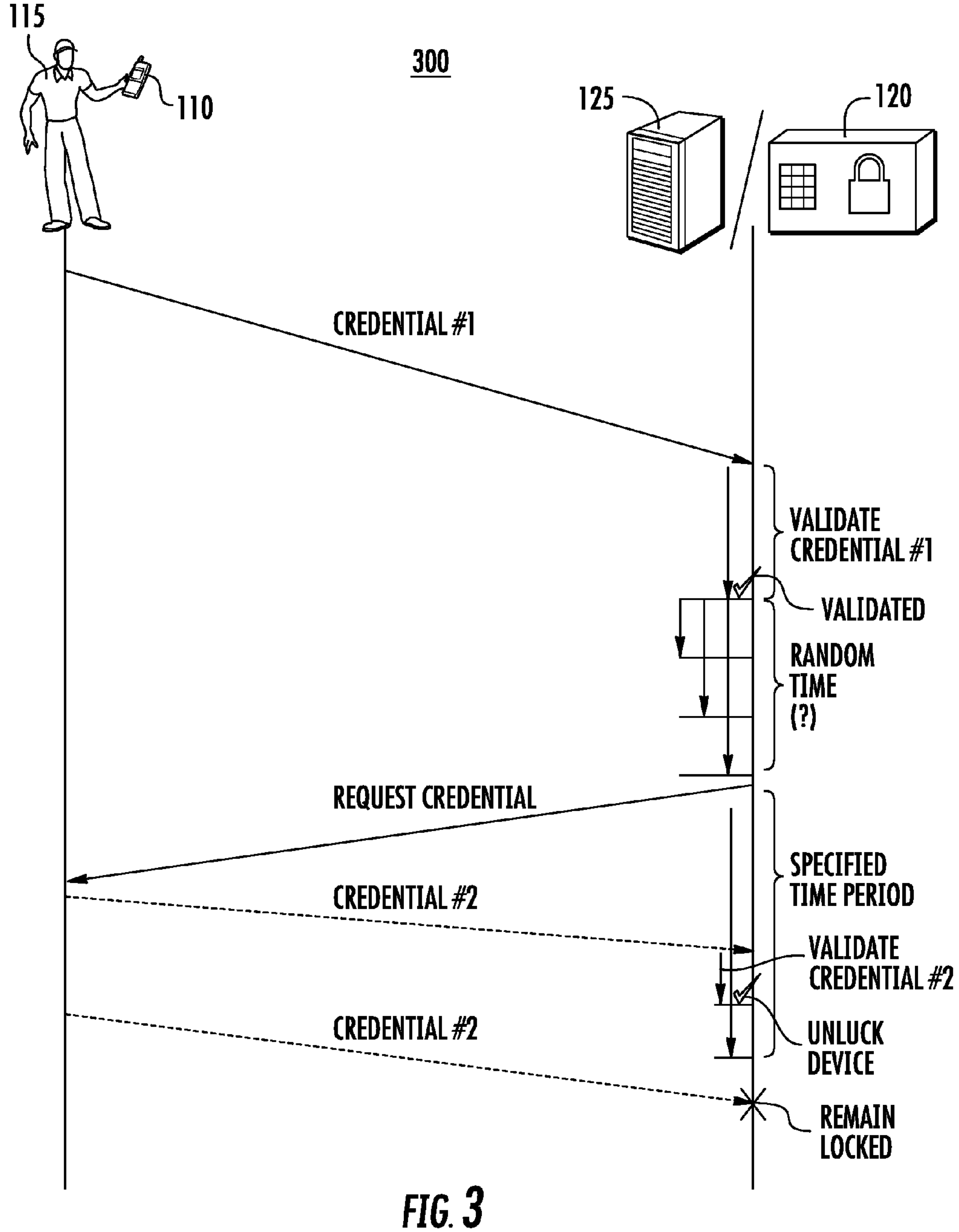
FIG. 3 illustrates a signaling diagram between a custodian and a locking device, shown in FIG. 1.

In particular, referring to FIG. 3, a signal diagram 300 is provided, and shows signals between custodian 115/mobile device 110 (collectively, hereafter referred to as "custodian 115") and locking device 120/lock management device 125 (collectively, hereafter referred to as "locking device 120"). As shown, custodian 115 provides a first credential to locking device 120. In turn, locking device 120 receives the first credential and performs credential validation (e.g., executes the credential validation sub-process 246, discussed above). As is appreciated by those skilled in the art, credential validation process 246 generally includes determining that a provided credential is valid (e.g., comparing a provided credential against an approved credential, decrypting the provided credential, extracting information from the credential, etc.). Operatively, such credential process 246 is executed by processor 220 and includes matching credentials via lookup table (e.g., data structures 245, etc.). Once validated, locking device 120 executes time delay process 248 that determines a random period of time and signals a lock release upon expiration of the random period of time causing locking device 120 to unlock or release.

With respect to the time delay policy process 248, locking device 120 determines a random period of time based on a number of criteria or factors including, but not limited to a threat level, custodian characteristics, geographic location of the locking device, and a time of day. These parameters can be fixed or dynamic. For example, the threat level can be incorporated within the first credential (provided by mobile device 110). Alternatively, the threat level can be pre-programmed into locking device 120 or locking management device 125. Generally, the threat level refers to particular characteristics of the first credential to indicate duress or an emergency. Custodian characteristics can refer to a level of responsibly of a particular custodian. For example, the time delay policy for lower level employees may be different than a higher level employee. The geographic location of the locking device can refer to a location-based threat level. For example, a locking device located in an area known to have a high level of crime has a different time delay policy than a locking device located in an area known to have a low level of crime. The time-of-day refers to the exact time of day the initial credential(s) are provided to locking device 120 and further reinforces the randomness and non-predictability of the time delay policy. The time-of-day can be embedded within the credential, determined by the locking device 120, provided by the locking management device 125, or any combination thereof.

The time delay process 248 also determines the random period of time according to a time window or a time-delay range. That is, the random period of time can be determined within a particular time-delay range (e.g., a random time period within a 5-15 minute time-delay range). As shown in signal diagram 300, the determined random period of time is determined according to three (3) time-delay ranges. For example, the time-delay range can include, but is not limited to the following time-delay ranges: 1-3 minutes, 5-9 minutes, and 10-15 minutes. Notably, the time-delay range can be field-programmable at the locking device and/or specified by the custodian. Further, the window of time or time-delay range can be adjusted according to the number of criteria or factors discussed above and it is appreciated that any number of time-delay ranges may be used without departing from the spirit and scope of this disclosure.

Upon expiration of the random period of time, locking device 120 sends a request to custodian 115 for an additional credential—namely, "Credential #2". Such a request can trigger a light illuminating, a buzzer sounding, and other notification indications as appreciated by those skilled in the art. Operatively, the custodian inputs the requested credential (e.g., a new credential and/or the same credential previously entered) within a specified length of time post expiration of the random period of time (e.g., 30 seconds), else the locking device 120 remains locked. The specified length of time post expiration of the random period of time ensures the physical presence of custodian 115 at the locking device when the lock is available for access. That is, while conventional locking systems that employ a fixed length of time prior to opening become predictable and may be left unattended (and even unlock when unattended), the random period of time and the request for a credential (i.e., Credential #2) within the specified period of time post expiration of the random period of time ensures that locking device does not unlock unless the attending custodian is physically present. Once the second credential is received by locking device 120 (within the specified time period), locking device 120 executes a lock release command and unlocks. Notably, if the second credential is received after the specified time period, locking device 120 remains locked, which can result in the entire process resetting to the beginning when custodian 115 inputs the first credential. Further, after unlocking, the locking device may re-lock and/or restrict access after for example, a specified period of time elapses, the custodian closes the locking device, the custodian inputs a lock engage command, etc.

The views shown in signaling diagram 300 are for sake of simplicity and any number of signals may be added or removed as desired. For example, while custodian 115 is shown as initially providing locking device 120 a single credential, certain embodiments of locking device 120 may require two or more initial credentials.

Figure 4:
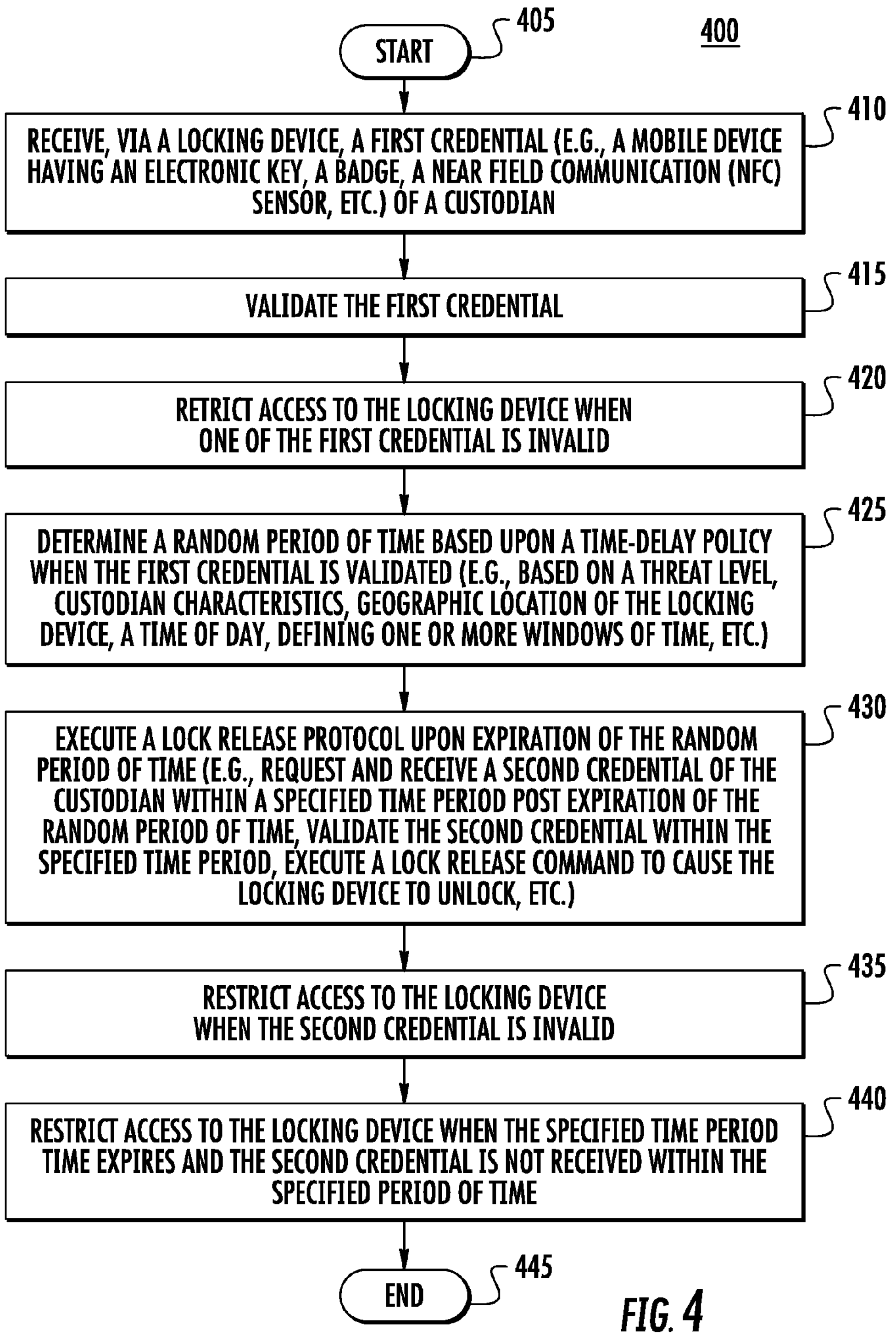
FIG. 4 illustrates an example simplified lock management procedure for validating custodian credentials using random time delays.

FIG. 4 illustrates an example simplified lock management procedure 400 for validating custodian credentials and using random time delays, particularly from the perspective of a locking device (including resident lock management electronics).

Procedure 400 starts at step 405, and continues to step 410, where, as described in greater detail above, the locking device receives a first custodian credential (e.g., from a mobile device having an electronic key, a custodian badge, a near field communication sensor (NFC), an access code, a PIN code, a pass phrase, etc.). Next, in step 415, the locking device validates the first credential. If the first credential is invalid, in step 420, the locking device remains locked (i.e., restricts access). Once validated, the locking device, in step 425, determines a random period of time based on a time-delay policy. For example, as discussed above, the time delay policy accounts for various factors including, but not limited to a threat level (e.g., emergency/duress), custodian characteristics, geographic location of the locking device, a time of day, etc. Moreover, the time-delay policy can further define one or more windows or ranges of time for the random-time delay (e.g., 0-5 minutes, 5-10 minutes, etc.). Once the random period of time expires, the locking device, in step 430, executes a lock release protocol. Such lock release protocol includes, for example, requesting, receiving and validating a second credential of the custodian within a specified time period post expiration of the random period of time. When the second credential is validated (within the specified time period), the lock release protocol executes a lock release command causing the locking device to unlock. However, as discussed above, in step 435, when the second credential is invalid (step 435) and/or when (step 440) the specified time period expires prior to receipt of the second credential, the locking device restricts access (e.g., remains locked, executes a lock engage command, etc.). Procedure 400 subsequently ends at step 445, or it may begin anew at step 410, where the locking device receives a first custodian credential.

It should be noted that certain steps within procedure 400 may be optional as described above and that the steps shown in FIG. 4 is merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for lock management using a time delay policy that incorporates a random period of time. In particular, the techniques herein significantly reduce inadvertently compromising security of locking devices. For example, once the random period of time expires, the locking device requests a credential from a custodian. If the credential is received after a specified period of time post expiration of the request, the locking device remains secure/locked.

While there have been shown and described illustrative embodiments that provide for improved lock management systems and techniques, it is to be understood that various other adaptations and modifications may be made within the spirit and scope of the embodiments herein. For example, the embodiments have been shown and described herein with relation to a locking device having resident hardware/software that can request, validate, and execute certain software instructions. However, the embodiments of the locking device in their broader sense are not as limited, and may, in fact, be used with in conjunction with other components (e.g., the locking management server can be remote from the locking device). Also, while certain steps such as determining the random period of time are performed by certain devices (i.e., the locking device), such steps can easily be modified to be executed by one or more custodian devices (i.e., the mobile device).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:

receiving, via a locking device, a first credential of a custodian;

validating the first credential;

determining a random period of time based upon a time-delay policy when the first credential is validated;

executing a lock release protocol upon expiration of the random period of time;

requesting, via the locking device, a second credential from the custodian within a specified time period upon expiration of the random period of time;

receiving, via the locking device, the second credential from the custodian within the specified time period;

validating the second credential; and executing a lock release command to cause the locking device to unlock when the second credential is validated.

2. The method of claim 1, further comprising:

restricting access to the locking device when one of the first credential is invalid and the second credential is not received within the specified time period.

3. The method of claim 1, further comprising:

receiving, via the locking device, a third credential of the custodian within a fixed length of time from receiving the first credential of the custodian, wherein the third credential is one of at least the first credential and the second credential, wherein validating the first credential comprises validating the first credential and the third credential, and wherein determining the random period of time based upon the time-delay policy comprises determining the random period of time based upon the time-delay policy when the first credential and the third credential are validated.

4. The method of claim 1, wherein the time-delay policy is based on at least one of a threat level, custodian characteristics, geographic location of the locking device, and a time of day.

5. The method of claim 1, wherein the time-delay policy defines one or more windows of time for the determined random period of time.

6. The method of claim 5, wherein the time-delay policy is field programmable at the locking device.

7. The method of claim 1, wherein one of the first credential and the second credential is provided by an electronic key device, wherein determining the random period of time is performed by at least one of the electronic key device and the locking device.

8. A locking device, comprising:

one or more network interfaces adapted to communicate in a network;

a processor adapted to execute one or more processes; and a memory configured to store a process executable by the processor, the process when executed operable to:

receive a first credential of a custodian;

validate the first credential;

determine a random period of time based upon a time-delay policy when the first credential is validated;

execute a lock release protocol upon expiration of the random period of time;

request a second credential from the custodian within a specified time period upon expiration of the random period of time;

receive the second credential from the custodian within the specified time period;

validate the second credential within the specified time period; and execute a lock release command to cause the locking device to unlock when the second credential is validated.

9. The locking device of claim 8, wherein the process, when executed is further operable to:

restrict access to the locking device when one of the first credential is invalid and the second credential is not received within the specified time period.

10. The locking device of claim 8, wherein the process, when executed is further operable to:

execute a lock engage command to cause the locking device to lock when the specified time period expires.

11. The locking device of claim 8, wherein the process, when executed is further operable to:

receive a third credential of the custodian within a fixed length of time from receiving the first credential of the custodian, wherein the third credential is one of at least the first credential and the second credential, wherein the process to validate the first credential, when executed, is further operable to validate the first credential and the third credential, and wherein the process to determine the random period of time based upon the time-delay policy, when executed, is further operable to determine the random period of time based upon the time-delay policy when the first credential and the third credential are validated.

12. The locking device of claim 8, wherein the time-delay policy is based on at least one of a threat level, custodian characteristics, geographic location of the locking device, and a time of day.

13. The locking device of claim 8, wherein the time-delay policy defines one or more windows of time for the determined random period of time.

14. The locking device of claim 13, wherein the time-delay policy is field programmable at the locking device.

15. A tangible, non-transitory, computer-readable media having software encoded thereon, the software, when executed by a processor, operable to:

receive a first credential of a custodian;

validate the first credential;

determine a random period of time based upon a time-delay policy when the first credential is validated;

execute a lock release protocol upon expiration of the random period of time;

request a second credential of the custodian within a specified time period upon expiration of the random period of time;

receive the second credential of the custodian within the specified time period;

validate the second credential within the specified time period; and execute a lock release command to cause the locking device to unlock when the second credential is validated.

16. The computer-readable media of claim 15, wherein the software, when executed by the processor is further operable to:

restrict access to the locking device when one of the first credential is invalid and the second credential is received within the specified time period.

* * * * *